United States Patent
Alacqua et al.

(10) Patent No.: US 8,100,410 B2
(45) Date of Patent: Jan. 24, 2012

(54) SEALING RING INTERPOSED BETWEEN THE BLOCK AND THE CYLINDER HEAD OF AN INTERNAL COMBUSTION ENGINE, HAVING A COMPOSITE STRUCTURE

(75) Inventors: Stefano Alacqua, Orbassano (IT);
Gianluca Capretti, Orbassano (IT);
Andrea Perosino, Orbassano (IT);
Antonino Veca, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 607 days.

(21) Appl. No.: 12/127,266

(22) Filed: May 27, 2008

(65) Prior Publication Data

US 2008/0296849 A1 Dec. 4, 2008

(30) Foreign Application Priority Data

Jun. 4, 2007 (EP) .................................... 07425344

(51) Int. Cl.
*F16J 15/12* (2006.01)
(52) U.S. Cl. ........................................ 277/593; 277/591
(58) Field of Classification Search .................. 277/590, 277/591, 593, 605, 645, 910
See application file for complete search history.

(56) References Cited

U.S. PATENT DOCUMENTS

| 2,819,920 | A | * | 1/1958 | Snyder et al. ................. 277/645 |
| 2,967,805 | A | * | 1/1961 | Forestek ......................... 205/73 |
| 5,033,426 | A | * | 7/1991 | Reichenbach et al. ..... 123/193.3 |
| 5,161,806 | A | * | 11/1992 | Balsells ........................ 277/383 |
| 5,577,472 | A | * | 11/1996 | Banta et al. ................ 123/193.3 |
| 6,036,194 | A | * | 3/2000 | Stamper ........................ 277/595 |
| 6,254,106 | B1 | * | 7/2001 | Denker et al. ................ 277/645 |
| 2002/0140179 | A1 | * | 10/2002 | Sadowski ..................... 277/593 |
| 2005/0242525 | A1 | * | 11/2005 | Dahlke et al. ................ 277/605 |

FOREIGN PATENT DOCUMENTS

| JP | 01 153871 A | 6/1989 |
| JP | 02 125194 A | 5/1990 |
| JP | 11 108194 A | 4/1999 |
| WO | WO 2005/119102 A1 | 12/2005 |

OTHER PUBLICATIONS

European Search Report for corresponding European Patent Application No. 07425344.4 dated Dec. 19, 2007.

* cited by examiner

*Primary Examiner* — Gilbert Lee
(74) *Attorney, Agent, or Firm* — Heslin Rothenberg Farley & Mesiti P.C.; Victor A. Cardona, Esq.

(57) ABSTRACT

A sealing ring is set between the engine block of an internal-combustion engine and a cylinder head fixed to the engine block, within a seat set concentrically around a cylinder of the engine. The sealing ring has a composite structure, with an external hollow annular body made of superelastic material, and an internal hollow annular body including a shape-memory alloy.

2 Claims, 3 Drawing Sheets

SEALING RING INTERPOSED BETWEEN THE BLOCK AND THE CYLINDER HEAD OF AN INTERNAL COMBUSTION ENGINE, HAVING A COMPOSITE STRUCTURE

CROSS REFERENCE TO RELATED APPLICATION

This application claims priority from European patent application No. 07425344.4, filed on Jun. 4, 2007, the entire disclosure of which is incorporated herein by reference.

BACKGROUND OF THE INVENTION

The present invention relates to sealing rings to be set between the engine block of an internal-combustion engine and a cylinder head fixed to said engine block, in which each ring is received in a seat formed around a cylinder within at least one of the mutually facing surfaces of the engine block and of the cylinder head, and in which said sealing ring comprises a hollow annular body, constituted by an elastically deformable material, provided within which is a shape-memory material.

A sealing ring of the type specified above is, for example, described and illustrated in the document No. WO-A-2005 119102, filed in the name of the present applicant.

SUMMARY OF THE INVENTION

The purpose of the present invention is to provide a sealing ring for internal-combustion engines that will present an extremely simple and low-cost structure and that at the same time will guarantee high sealing properties in any operative condition of the engine.

With a view to achieving said purpose, the subject of the invention is a sealing ring of the type referred to at the start of the present description, characterized in that the aforesaid hollow annular body is formed by means of bending and joining of the ends of a sectional element constituted by a metal alloy having a superelastic behaviour with respect to the deformation of bending necessary for joining its ends, and having, instead, an elastic behaviour with respect to a deformation of its cross section following upon squeezing of the annular body between the engine block and the cylinder head of the engine, within the seat that receives it, and in which the aforesaid shape-memory material is made in the form of a second hollow annular body, constituted by a shape-memory metal alloy, set within said first hollow annular body made of superelastic material.

The superelastic material can be typically a nickel-titanium alloy with appropriate elementary composition. By "superelastic behaviour" is meant herein the capacity for undergoing deformation at constant stress, which corresponds to a horizontal line in the stress/strain diagram. The superelastic property of the material with which the external annular body is constituted enables ease of production starting from linear extruded sectional elements, closed to form a ring and appropriately jointed.

On account of its characteristic of implementation (cold or hot extrusion), the hollow annular body has an anisotropic behaviour, which is superelastic in the direction of extrusion, and elastic in the perpendicular direction, corresponding to the direction in which it undergoes compressive stress in conditions of operation. The ring consequently has an elastic behaviour required of the materials used for making seals.

In the preferred embodiment, the first and second hollow annular bodies are made of two separate pieces.

Alternatively, the first and second hollow annular bodies are made of a single piece starting from a hollow annular element made of shape-memory material, the outer surface of which is subjected to a mechanical bombardment, for example by means of sandblasting, for the purpose of bestowing thereon the necessary elastic properties with respect to the deformations corresponding to a squeezing of the cross section.

In the aforesaid preferred embodiment, in which the first and second bodies are two separate pieces, they have cross sections of identical shape set in contact, one inside the other.

At ambient temperature, and in the undeformed condition, the cross section of the sealing ring according to the invention has an axial dimension; i.e., in the direction of the axis of the ring, larger than the axial dimension of the seat that is to receive the ring when the cylinder head is fixed to the engine block. Consequently, following upon fixing of the cylinder head on the engine block (by means of tightening of the connection screws), the sealing ring according to the invention is subjected to a compression in the direction of its axis, which gives rise to the deformation of the internal shape-memory element and at the same time to an elastic reaction due substantially to the external annular body. In the operative condition of the engine, following upon raising of temperature, the shape-memory material constituting the internal annular body exceeds a transition temperature. The shape-memory element is pre-arranged so that, following upon said overstepping of the transition temperature, it is subject to a transformation of phase that tends to cause recovery of the deformation undergone in the step of tightening of the cylinder head. This generates an additional force tending to expand the cross section of the ring in the direction of the axis of the ring.

Consequently, in the ring according to the invention, during the operative condition of the engine, the seal is guaranteed by the high force of expansion to which the ring is subject as a result both of the elastic reaction of the external annular body made of superelastic material and of the force that is generated following upon the transformation of phase of the shape-memory material constituting the internal hollow annular body. Consequently, the sealing ring is forcefully pressed against the mutually facing surfaces of the cylinder head and of the engine block and guarantees an effective seal in any operating condition of the engine and also in the case of stresses and vibrations of the engine itself that generate a temporary mutual recession of the mutually facing surfaces of cylinder head and engine block.

Shape-memory alloys have been studied and developed for some time now and find a wide range of applications. They are typically nickel-and-titanium-based alloys, which, following upon a passage of temperature beyond a transition temperature, pass from a martensitic phase to an austenitic phase, giving rise to a deformation. When the temperature returns below the transition temperature, they re-acquire their original configuration. Said alloys, according to their elementary composition, can likewise present a superelastic behaviour. Superelastic materials have also been studied and developed for some time now. Also these can be constituted by nickel-and-titanium-based alloys, which are in the austenitic phase already at ambient temperature.

Alternatively, the sealing ring can be obtained using a single ring with hollow section made of shape-memory material, in which the elastic properties of the outer wall can be obtained by subjecting the surface of the element to a mechanical bombardment, for example by means of a process of sandblasting, which causes a surface hardening of the material and the generation of an elastic behaviour.

It is particularly important, for the purposes of achieving the result that the invention sets itself, that the internal annular body made of shape-memory material should have a hollow cross section.

BRIEF DESCRIPTION OF THE DRAWINGS

The characteristics and advantages of the invention will emerge from the ensuing description with reference to the annexed plates of drawings, which are provided purely by way of non-limiting example and in which.

DETAILED DESCRIPTION OF THE INVENTION

Figure 1:
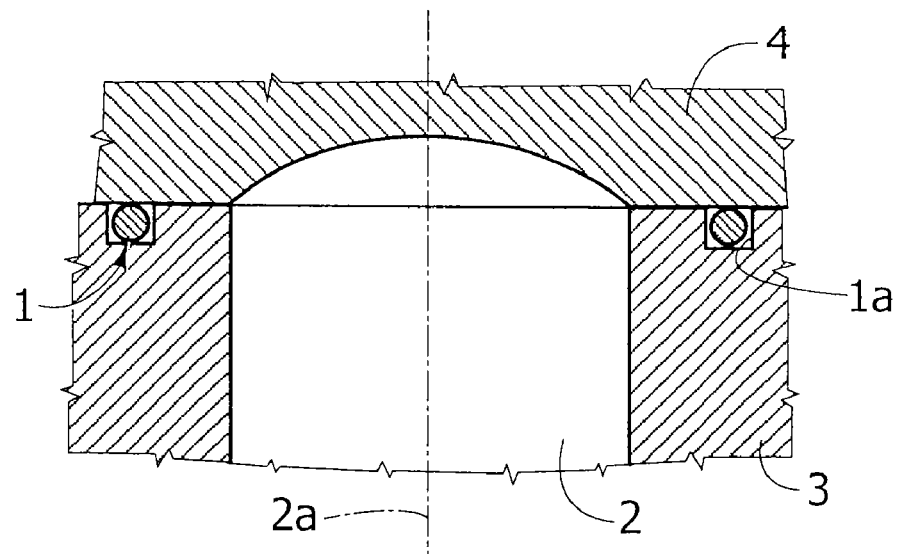
FIG. 1 is a schematic cross-sectional view of a cylinder of an internal-combustion engine, associated to which is a sealing ring according to the invention.

In FIG. 1, the reference number 1 designates as a whole a sealing ring according to the present invention, which is set concentrically around the axis 2a of a cylinder 2 of the engine and is operatively set between the top surface of the engine block 3 and the bottom surface of a cylinder head 4. In the case illustrated, the sealing ring 1 is received in a seat 1a made in the top surface of the engine block 3.

Figure 3:
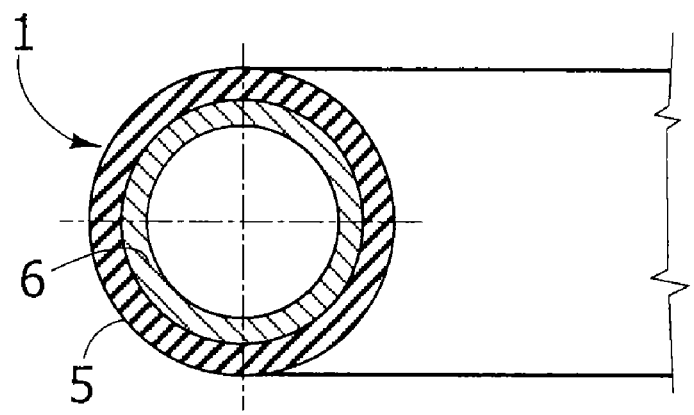
FIG. 3 is a cross-sectional view at an enlarged scale, according to the line III-III, of the ring of FIG. 2.

FIG. 3 is an overall view of the ring 1 according to the invention, viewed in the direction of its axis 1b.

Figure 2:
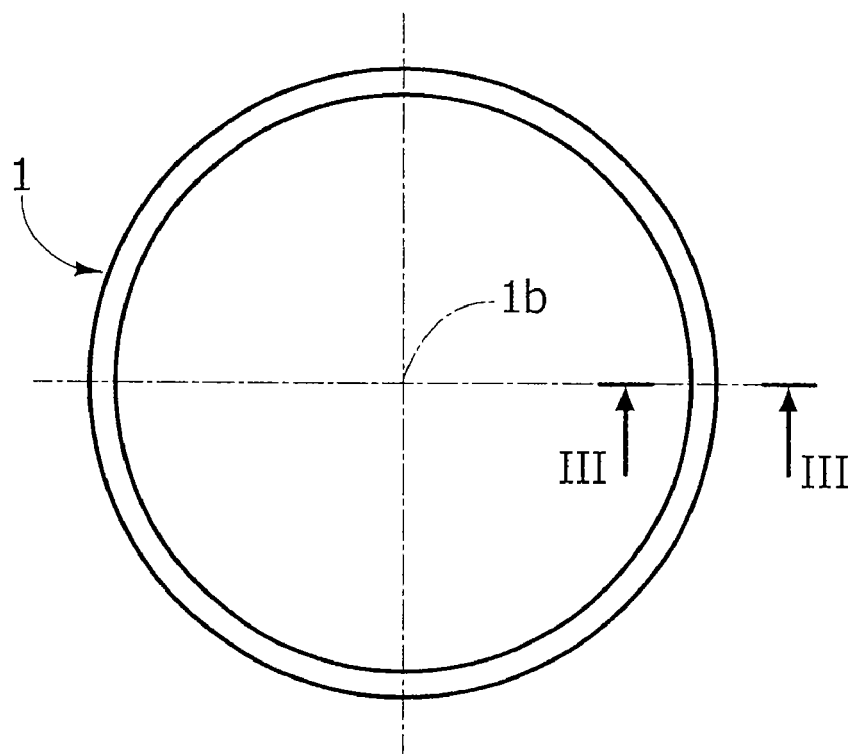
FIG. 2 is a view of a sealing ring according to the invention, in the direction of its axis.

As may be seen in FIG. 3, which illustrates a cross section according to the line III-III of FIG. 2, the ring 1 has a composite structure, with a hollow annular body 5, which in the example illustrated is formed by means of a tube with circular cross section, jointed at its ends, and by a hollow annular body 6 set within, and in contact with, the hollow annular body 5. The hollow annular body 5 is constituted by a superelastic metal alloy but with an elastic behaviour in the range of deformation to which the ring itself is subjected in conditions of operation, whilst the internal hollow annular body 6, which, in the case of the example illustrated, is also constituted by a tube with circular cross section, is made of a shape-memory made of nickel-titanium alloy, having a transition temperature from the martensitic phase to the austenitic phase higher than the ambient temperature so that said transition temperature is reached only when the internal-combustion engine is running.

Figure 4:
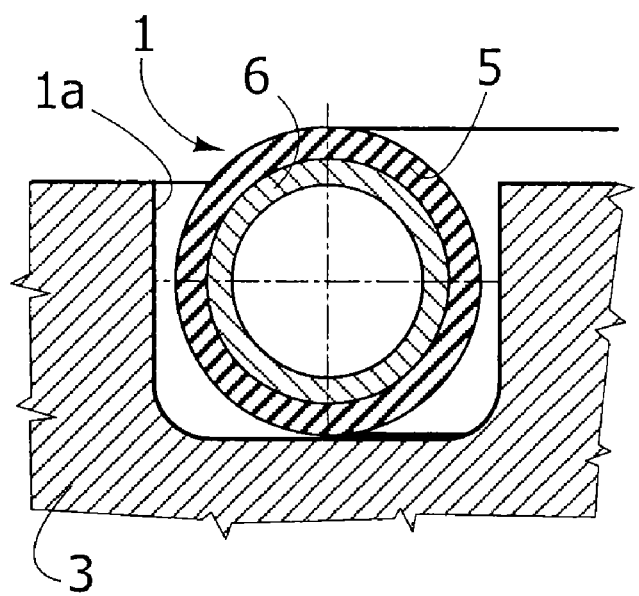
FIGS. 4 to 6 illustrate the cross section of FIG. 3 in three different operating conditions.

FIG. 4 shows the sealing ring 1 in its undeformed condition within the seat 1a, prior to fixing of the cylinder head 4. As may be seen, in the undeformed condition, the axial dimension of the cross section of the ring 1 is larger than the axial dimension of the seat 1a, so that the ring 1 projects beyond the top of the engine block 3.

Figure 5:
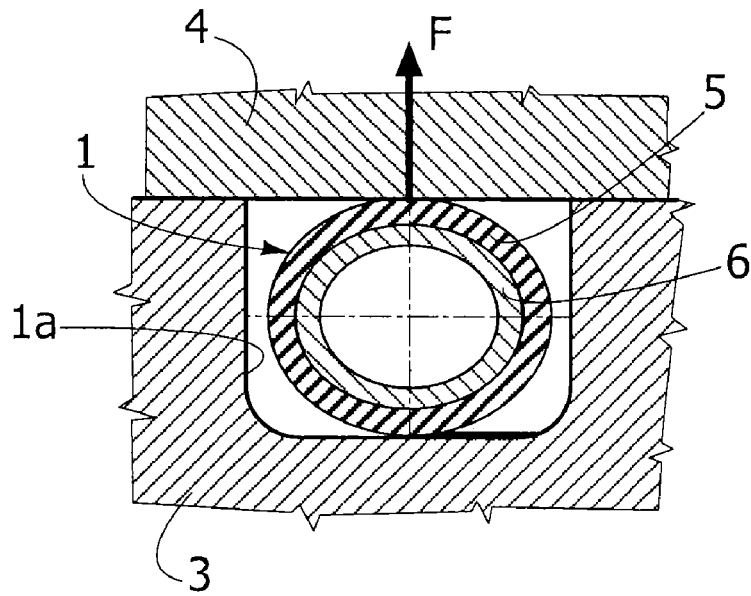
Figure 6:
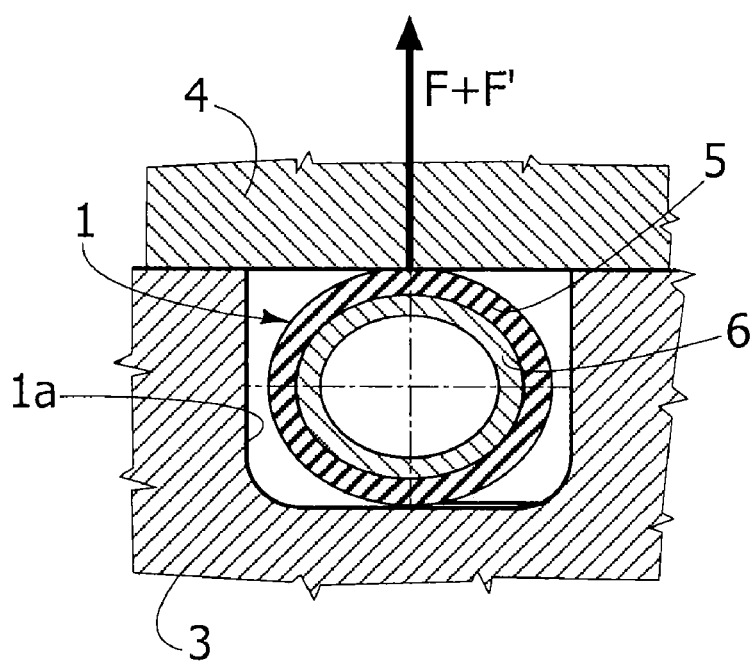

FIG. 5 shows the deformed condition of the ring 1 following upon installation of the cylinder head 4, when the engine is not running, i.e., at ambient temperature. In said condition, the sealing ring 1 according to the invention is already able to guarantee the necessary seal in so far as the deformation of the external hollow annular body 5, made of superelastic material, generates an elastic reaction F that ensures an adequate pressure of contact between the ring 1 and the bottom surface of the cylinder head 4, on the one hand, and the bottom of the seat 1a, on the other.

During the operative condition of the engine, a rise in temperature causes a transition of the shape-memory material constituting the internal hollow annular body 6 so that the latter is subject to an expansion in the axial direction of its cross section generated by recovery of the deformation undergone, with consequent generation of an additional force F', which is added to the force F generated by the elastic reaction of the body external 5 made of superelastic material. Consequently, during the operative condition of the engine, the capacity of sealing is enhanced, which guarantees maintenance of an adequate seal also in critical conditions, such as for example during temporary recession of the mutually facing surfaces of the engine block and cylinder head following upon the vibrations and stresses to which the engine is subject.

It is particularly important, for the purposes of achieving the result that the invention sets itself that the internal annular body 6 made of shape-memory material should have a hollow cross section. The tubular body 6 can also be obtained, instead of in the form of a continuously walled tubular element, by means of a strip made of shape-memory material wound in a helix so as to define in effect a tubular body, which is then jointed at its ends to form the hollow annular body.

Of course, without prejudice to the principle of the invention, the details of construction and the embodiments may vary widely with respect to what is described and illustrated herein purely by way of example, without thereby departing from the scope of the present invention, as defined in the annexed claims.

What is claimed is:

1. A sealing ring set between an engine block of an internal-combustion engine and a cylinder head fixed to said engine block, said ring being received in a seat formed around a cylinder within at least one of the mutually facing surfaces of the engine block and of the cylinder head, wherein said sealing ring comprises:

an outer hollow annular body having a closed cross-section, said outer hollow annular body made of an elastically deformable metal alloy, said outer hollow annular body comprising ends of a sectional element joined together, wherein said elastically deformable metal alloy has a superelastic behaviour with respect to a deformation of bending necessary for joining ends of said sectional element, and wherein said elastically deformable metal alloy being elastically deformable in response to a squeezing of the outer annular body between the engine block and the cylinder head of the engine, within the seat that receives said ring, to cause a deformation of said cross section of said outer hollow annular body; and an internal hollow annular body having a closed cross-section, said internal hollow annular body set within said outer hollow annular body and made of a shape-memory metal alloy which, following a passage of its temperature beyond a transition temperature, passes from a martensitic phase to an austenitic phase, wherein, in an undeformed condition, said ring has an axial dimension larger than an axial dimension of said seat defined between the engine block and the cylinder head, so that mounting the cylinder head on the engine block causes a compression in an axial direction of the cross-section of said sealing ring, which generates an elastic reaction principally due to the superelastic material of the outer hollow annular body, and wherein shape-memory metal alloy of the internal hollow annular body is chosen so as to have a transition temperature higher than the ambient temperature, so that when the temperature of said internal hollow annular body rises above said transition temperature due to engine operation, the cross-section of the internal hollow annular body expands in the axial direction due to the shape memory effect of said shape memory alloy to cause a further reacting force in addition to the elastic reaction of said outer hollow annular body, which ensures an adequate contact pressure between the sealing ring and the cooperating surfaces of the cylinder head and the engine block even in the presence of vibrations and stresses to which the engine is subject during its operation.

2. The sealing ring according to claim 1, wherein the external and internal hollow annular bodies have a hollow cross section with a circular profile.

* * * * *